(12) United States Patent
Rittmann et al.

(10) Patent No.: US 7,491,331 B2
(45) Date of Patent: Feb. 17, 2009

(54) METHODS FOR TOTAL NITROGEN REMOVAL

(75) Inventors: Bruce E. Rittmann, Tempe, AZ (US); César Torres, Chicago, IL (US); Jennifer Cowman, Woodbury, MN (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 12/121,036

(22) Filed: May 15, 2008

(65) Prior Publication Data

US 2008/0217242 A1    Sep. 11, 2008

Related U.S. Application Data

(63) Continuation of application No. 11/129,133, filed on May 13, 2005, now Pat. No. 7,384,554.

(60) Provisional application No. 60/571,344, filed on May 14, 2004.

(51) Int. Cl.
  *C02F 3/00* (2006.01)
(52) U.S. Cl. .................. 210/603; 210/620; 210/220; 210/615; 210/757; 210/758
(58) Field of Classification Search ................ 210/603, 210/620, 220, 615, 757, 758
See application file for complete search history.

(56) References Cited

U.S. PATENT DOCUMENTS

| | | | |
|---|---|---|---|
| 4,746,435 A | 5/1988 | Onishi et al. | |
| 5,116,506 A | 5/1992 | Williamson et al. | |
| 5,348,653 A | 9/1994 | Rovel | |
| 5,641,679 A | 6/1997 | Pierce | |
| 6,214,607 B1 | 4/2001 | Logan | |
| 6,387,262 B1 | 5/2002 | Rittmann et al. | |
| 6,423,533 B1 | 7/2002 | Gearheart et al. | |
| 6,572,773 B1 | 6/2003 | Dempsey | |
| 6,630,067 B2 | 10/2003 | Shich et al. | |
| 6,767,464 B2 | 7/2004 | Boyd et al. | |
| 6,863,815 B1 | 3/2005 | Smith | |
| 6,881,339 B1 | 4/2005 | Hogl et al. | |
| 6,942,799 B2 | 9/2005 | Corcho-Sanchez et al. | |
| 7,001,519 B2 | 2/2006 | Linden et al. | |
| 7,101,483 B2 | 9/2006 | Volker et al. | |
| 7,140,495 B2 | 11/2006 | Hester et al. | |
| 7,144,508 B2 | 12/2006 | Isaka et al. | |
| 7,144,509 B2 | 12/2006 | Biyd et al. | |
| 7,169,295 B2 | 1/2007 | Husain et al. | |
| 7,175,763 B2 | 2/2007 | Husain et al. | |

(Continued)

FOREIGN PATENT DOCUMENTS

WO    WO 2004/113239    12/2004

OTHER PUBLICATIONS

Rittmann et al., Nitrochem Proposal, Proposal and Scope of Word, HFMBFR Demonstration Testing for Nitrochem, Maitland Ontario, pp. 1-7 (Oct. 2002).

(Continued)

*Primary Examiner*—Chester T Barry
(74) *Attorney, Agent, or Firm*—Reinhart Boerner Van Deuren S.C.

(57)    ABSTRACT

A method and related apparatus for oxidation and reduction of a reduced aqueous nitrogen contaminant.

9 Claims, 10 Drawing Sheets

U.S. PATENT DOCUMENTS

| | | |
|---|---|---|
| 7,186,340 B1 | 3/2007 | Rittmann et al. |
| 7,338,597 B1 | 3/2008 | Rittmann |
| 2005/0051481 A1 | 3/2005 | Husain et al. |
| 2005/0269263 A1 | 12/2005 | Rittmann et al. |
| 2006/0021936 A1 | 2/2006 | Husain et al. |
| 2006/0037896 A1 | 2/2006 | Cote et al. |
| 2006/0096918 A1 | 5/2006 | Semmens et al. |
| 2006/0163157 A1 | 7/2006 | Cote et al. |
| 2006/0196815 A1 | 9/2006 | Isaka et al. |

OTHER PUBLICATIONS

Rittmann et al., Draft Scope of Word, HFMBFR Demonstration Testing Nitrochem, Maitland Ontario, pp. 1-7 (Sep. 2002).

METHODS FOR TOTAL NITROGEN REMOVAL

This application is a continuation of and claims priority benefit from application Ser. No. 11/129,133 filed May 13, 2005, now U.S. Pat. No. 7,384,554, which claimed priority from provisional application Ser. No. 60/571,344 filed May 14, 2004, each of which is incorporated herein by reference in its entirety.

BACKGROUND OF THE INVENTION

Excess nitrogen input to water bodies is becoming a substantial environmental concern. In general, elevated concentrations of nitrogenous species (N), such as ammonium or nitrate, spur eutrophication, which can lead to hypoxia, odors, color, and other undesirable water-quality changes. Ammonium also can be directly toxic to fish and exhibits a large oxygen demand. Furthermore, elevated levels of nitrate in drinking water cause methemoglobinemia in infants (Maxcy, 1950; Masters, 1998). As a result, the USEPA set the maximum containment level (MCL) for nitrate to 10 mg $NO_3^-$—N/l for drinking water (Masters, 1998). Ironically, the problems of N in water environments demand concentrations far lower than the MCL. In the future, wastewater discharge standards for total N may be as low as 1 to 3 mgN/L when the watershed is sensitive to eutrophication or hypoxia.

Ammonium is the most usual form of nitrogen pollution in wastewaters of various types. It is produced during the production of fertilizers and chemicals. As a result, large amounts of ammonium are present in agricultural runoff and discharges from the fertilizer industry. Ammonium pollution also is attributed to over-fertilization and intensive livestock farming. Another major source of ammonium nitrogen is domestic wastewater, since the N present in organic material in human wastes is ammonium or organic N that can be hydrolyzed to ammonium.

SUMMARY OF THE INVENTION

In light of foregoing, it is an object of the present invention to provide one or more methods, apparatus and/or systems for waste stream removal of nitrogenous contaminants, including without limitation ammonia and ammonium compounds, thereby addressing various concerns and issues relating to the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is an object of the present invention to provide one or more methods for removal of reduced nitrogenous contaminants, including without limitation ammonium compounds and related organic amine and quaternary amine contaminants, to levels meeting state and/or federal regulatory requirements.

It is another object of the present invention to provide for oxidation of reduced nitrogenous contaminants, alone or in conjunction with one or more influent oxidized nitrogen contaminants, in route to total nitrogen removal from an aqueous system.

It is another object of the present invention to provide one or more apparatus and/or system configurations, for use in conjunction with the present methodologies, to effect simultaneous or coordinated oxidation and reduction of nitrogenous contaminants for N removal from an aqueous waste stream.

Other objects, features, benefits and advantages of the present invention will be apparent from the summary and its descriptions of various embodiments, and as apparent to those skilled in the art having knowledge of various oxidation/reduction reactions and waste treatment systems. Such objects, features, benefits and advantages will be apparent from the above as taken into conjunction with the accompanying examples, data, figures, and all reasonable inferences to be drawn therefrom.

The present invention comprises one or more methods, together with apparatus and systems used in conjunction therewith, for nitrification and denitrification of nitrogenous waste components en route to total nitrogen removal from an aqueous waste stream. In accordance therewith, nitrification can be considered in the context of and illustrated by oxidation of an ammonium species (e.g., $NH_4^+$) to nitrate (e.g., $NO_3^-$) by nitrifying bacteria, as can be represented by the following non-limiting reaction:

The oxidation of ammonium to nitrate can generate two acid equivalents ($H^+$) per mole of nitrogen oxidized, with available molecular oxygen ($O_2$), as shown. (2 mol $O_2$/mol $NH_4^+$) Denitrification, conversely, can be considered as a reduction in which nitrate is reduced to nitrogen gas ($N_2$), according to the non-limiting half reaction:

$N_2$ gas evolves, thereby eliminating N from the water. $H_2$ is microbiologically oxidized to provide the electrons ($e^-$) to drive nitrate reduction, the oxidation half reaction for which is:

$$H_2 \rightarrow 2e^- + 2H^+$$

Combining the two half reactions, denitrification can be represented as $$NO_3^- + 2.5H_{2(g)} \rightarrow 0.5N_{2(g)} + 2H_2O + OH^-$$

Overall, denitrification provides for reduction of nitrate to nitrogen gas, with one base equivalent ($OH^-$) per mole of nitrogen reduced.

Accordingly, the present invention provides a method for removal of nitrogen components from an aqueous waste system. Such a method comprises (1) providing a system comprising at least one nitrification bacterium, and at least one denitrification bacterium; (2) introducing, to the system, an aqueous waste stream or water supply comprising a reduced nitrogenous component; and (3) contacting the system independently with oxygen and hydrogen. Aerobic conditions promote accumulation of nitrifying bacteria known in the art, while anoxic conditions, conversely, promote accumulation of denitrifying bacteria, also known in the art. Alternatively, such a system can be inoculated with nitrifying and/or denitrifying bacteria. Upon introduction of a reduced nitrogenous waste component, such as but not limited to an ammonium compound, oxidation and reduction proceed to effect removal of both reduced and oxidized nitrogen species from the aqueous system.

Alternatively, this invention can also provide a method of using denitrification bacteria to remove a reduced nitrogenous contaminant from a waste stream or water supply. Such a method comprises (1) providing a system comprising a first component comprising at least one nitrification bacterium and an aqueous volume comprising a reduced nitrogenous contaminant, and a second component comprising at least one denitrification bacterium; (2) contacting the first component with gaseous oxygen to oxidize the nitrogenous contaminant; (3) introducing and/or transferring the oxidized nitrogenous contaminant to the second component; and (4) contacting the second component with gaseous hydrogen. Certain embodiments of such a method can be considered in the context of a reduced nitrogenous contaminant, such as but not limited to ammonia or an ammonium compound. Aerobic conditions can promote accumulation of a biomass comprising nitrification bacteria and oxidation to one or more oxidized (e.g., nitrate, nitrite) nitrogenous contaminants. Subsequent introduction of such an oxidized contaminant to the second component and a biomass comprising denitrification bacteria, as can be promoted under anoxic conditions, reduces the contaminant for waste stream removal.

Aerobic and anoxic conditions can be changed and/or optimized, depending upon a particular waste stream and nitrogen species/content, by variation of oxygen and hydrogen pressures, respectively. (See, Examples 2-4, below.) Such coordinated oxidation and reduction can reduce effluent concentrations to less than about 1 mgN/L for a particular reduced or oxidized nitrogen contaminant. Likewise, total nitrogen effluent can be reduced to concentrations less than about 2 mg/L, in accordance with applicable state and federal regulatory requirements. Simultaneous, sequential or coordinated oxidation and reduction also provide for neutralization of an acid by-product of nitrification by a base by-product of denitrification, thereby minimizing or eliminating the need for extraneous system pH control. In addition to the benefits of acid/base neutralization, waste water recirculation can afford various other advantages. For example, repeat processing or cyclization can enhance contaminant removal. Alternatively, recirculation can be used to control water flow velocity past one or both of the nitrification and denitrification reactor (i.e., NR and DR) components, independently from the influent flow rate. A high flow velocity in either component can promote a strong, dense biofilm and mass transfer of reduced or oxidized nitrogen contaminant to the biofilm. Such aspects and related benefits of the present methodologies can be considered with reference to FIGS. 1A-B and 2A-B, below, such figures non-limiting with respect to any particular method/process parameter or system component material, dimension or configuration provided therein.

Such methods can be employed without restriction to any one apparatus or component configuration. Nonetheless, one or more methods of this invention can be used in conjunction with an apparatus comprising (1) a first component comprising at least one hollow membrane, each of which is in fluid communication with an oxygen source; and (2) a second component in fluid communication with the first component, the second component comprising at least one hollow membrane, each of which is in fluid communication with a hydrogen source. In certain embodiments, the membrane can comprise inner and outer layers having a first density and a layer therebetween having a second density greater than the first density. In various preferred embodiments, while the former layers can be porous, the latter layer can be substantially non-porous to reduce or avoid sparging of either hydrogen or oxygen, or conditions otherwise deleterious to biomass accumulation.

Likewise, without restriction to any one waste treatment system, apparatus or component configuration, this invention can also provide a method for oxidation of a reduced nitrogenous contaminant. Such a method can comprise: (1) providing a system comprising a component comprising a membrane and nitrification bacteria thereon, and an aqueous volume comprising a reduced nitrogenous contaminant; and (2) contacting the system with oxygen to oxidize the nitrogenous contaminant. As discussed elsewhere herein, such a system can be inoculated with bacteria, or aerobic conditions can selectively promote accumulation of a biomass comprising nitrification bacteria. In certain embodiments, such a system can comprise at least one membrane component in fluid communication with an oxygen source. Such a component can be arranged and configured as described above, or in one or more of the incorporated references cited below. A corresponding oxidized contaminant can then, without limitation, be introduced to a second system or component comprising denitrification bacteria, as described elsewhere herein, to reduce the contaminant for subsequent removal. Alternatively, such an oxidation method and/or use of nitrification bacteria can be used in conjunction with any reduction or denitrification process known in the art.

DETAILED DESCRIPTION OF CERTAIN EMBODIMENTS

System/apparatus component configurations, as can be employed, are described more fully in U.S. Pat. No. 6,387,262 and pending application Ser. No. 10/930,051 filed Aug. 30, 2004, each of which is incorporated herein by reference in its entirety. Apparatus components and configurations, as enumerated and provided in the figures and corresponding specification of such incorporated references, can be used effectively within the context of this invention. Accordingly, in certain embodiments, a membrane biofilm reactor (MBfR)

can deliver $H_2$ or $O_2$ gas to denitrifying or nitrifying bacteria, respectively, by diffusing through the wall of a bubble-less membrane. A bacterial biofilm naturally develops on the outside of the corresponding membrane wall. Nitrification bacteria utilize $O_2$ to facilitate oxidation of a reduced nitrogen component to, e.g., $NO_3^-$. With regard to denitrification, bacteria in the biofilm remove electrons from $H_2$ diffused to the outside of the membrane to reduce $NO_3^-$ to $N_2$ gas.

Nitrifying bacteria are known in the art, representative species of which include but are not limited to *Nitrosomonas europaea, Nitrosomonas eutropha, Nitrosospira briensa, Nitrobacter agilis*, and *Nitrospira marina*. Likewise, denitrification bacteria are also available and well-recognized. Although not limited to autotrophic (i.e., hydrogen-oxidizing) species, representative examples of such organisms include but are not limited to *Paracoccus denitrificans, Alcaligenes eutrophus, Pseudomonas pseudoflava*, and *Ralstonia eutropha*. Such bacteria can be introduced to respective oxidation and reduction reactor components using a corresponding inoculant from an existing nitrogen treatment system or through selective reactor biomass accumulation under the aerobic and anoxic conditions induced therein. (See, e.g., the aforementioned incorporated '262 patent and the co-pending '051 application.)

An $H_2$-based MBfR is useful for reducing $NO_3^-$ (or, e.g., nitrite, $NO_2^-$) to $N_2$ gas. $H_2$ is the least expensive electron donor that can be purchased in bulk quantity, and it is non-toxic to humans. Using $H_2$ eliminates the need to supply an organic-C source, which is expensive, often introduces handling and safety problems, and can easily be under-dosed or over-dosed. Delivering $H_2$ by diffusion through the membrane wall eliminates the risk of over-dosing, and under-dosing is simply and rapidly remedied by increasing the $H_2$ pressure to the membrane. Having biofilm on the membrane wall ensures nearly 100% efficiency of $H_2$ use improving the cost-effectiveness of the process. A benefit of using a bubble-less membrane is safe delivery of $H_2$ gas. With other delivery methods, hydrogen gas can accumulate in the gas phase to create an explosive environment and thus a substantial safety risk (the explosive range for hydrogen is about 4 to 74.5% in air). Bubble-less delivery and immediate $H_2$ consumption by the biofilm preclude formation of an explosive gas phase.

Figure 1A:
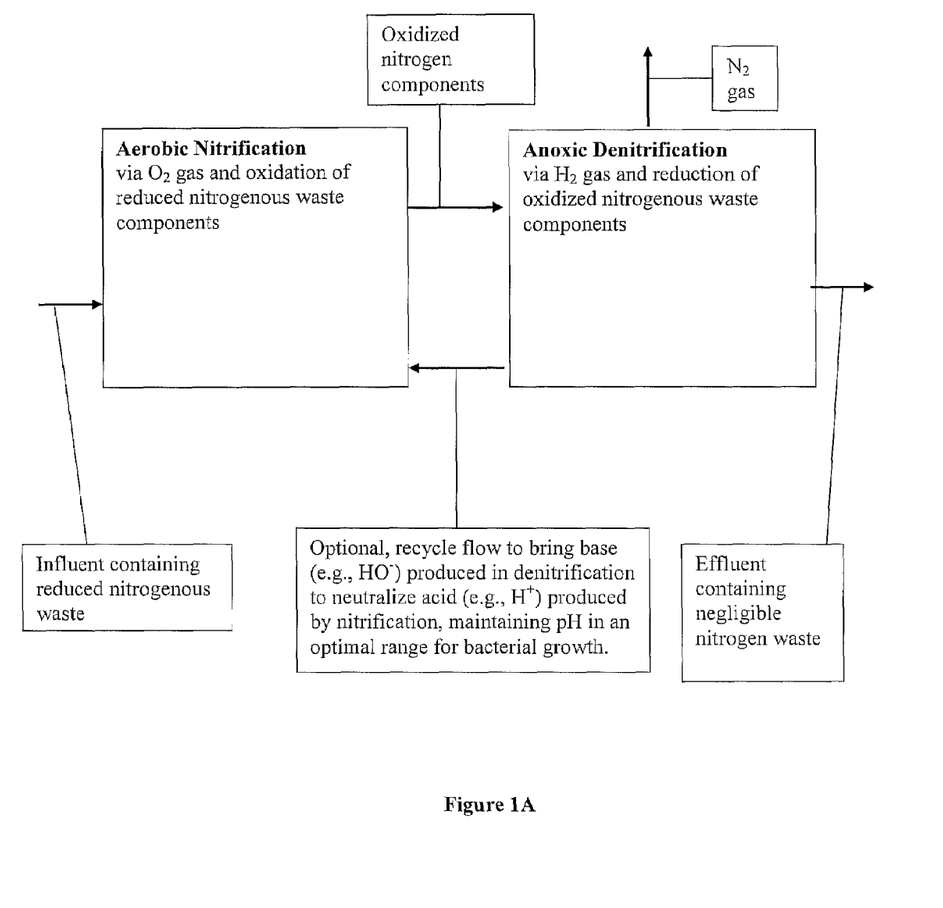
FIG. 1A: A schematic diagram illustrating one or more of the present methods, in accordance with one or more embodiments of this invention.
Figure 1B:
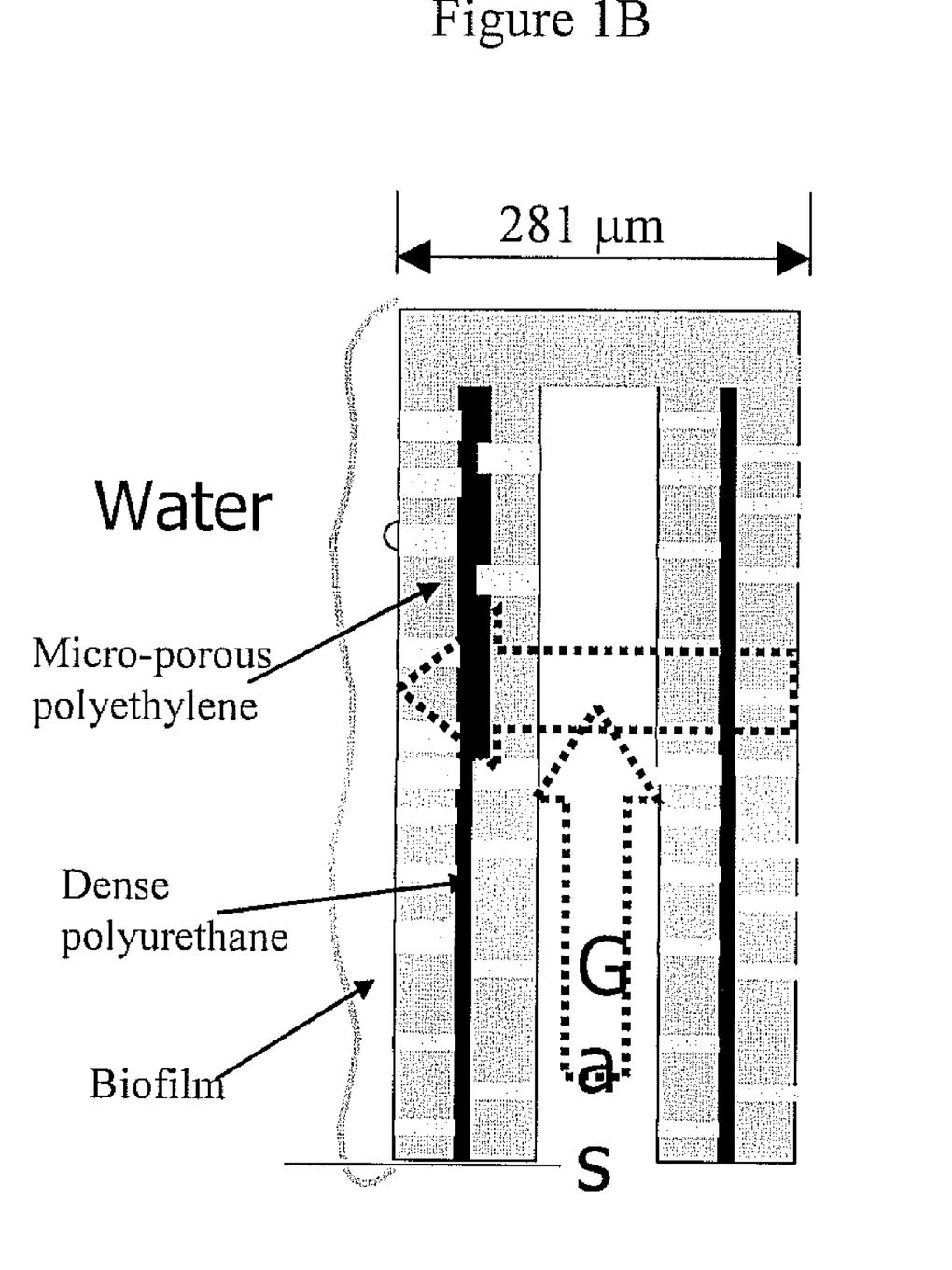
FIG. 1B: Schematic diagram of a hollow-fiber with the gas ($H_2$ or $O_2$) diffusing through the membrane wall and utilized by a biofilm on the outside, in accordance with one or more embodiments of this invention.

For total nitrogen removal, any reduced nitrogen component (e.g., ammonia or an ammonium species) present is oxidized to $NO_3^-$ (or nitrite, $NO_2^-$) by aerobic nitrifying bacteria. An MBfR system and apparatus of this invention can also be used for both denitrification and nitrification. As illustrated in FIG. 1B, $O_2$ gas can be delivered by diffusion through a membrane wall. To prevent bubbling, a fiber component can comprise a 1-µm thick nonporous, hydrophobic polyurethane layer located between micro-porous polyethylene walls. Fibers of the sort useful in systems/apparatus components of the sort illustrated in FIG. 1B are manufactured by Mitsubishi Rayon (Model MHF 200TL) and are available as a composite. A dense, non-porous layer allows the creation of a high driving force for gas dissolution without premature bubble formation, thereby promoting efficient oxygen use and accumulation of desired nitrifying bacteria. The hollow fibers can be sealed on one end and open to pressurized oxygen (or hydrogen) on the opposite end. Other fiber configurations known in the art can provide bubble-less operation. Induced biofilm accumulation facilitates electron transport between an aqueous nitrogen component (e.g., $NH_4^+$ or $NO_3^-$) and a gas introduced (e.g., $O_2$ or $H_2$).

Figure 2A:
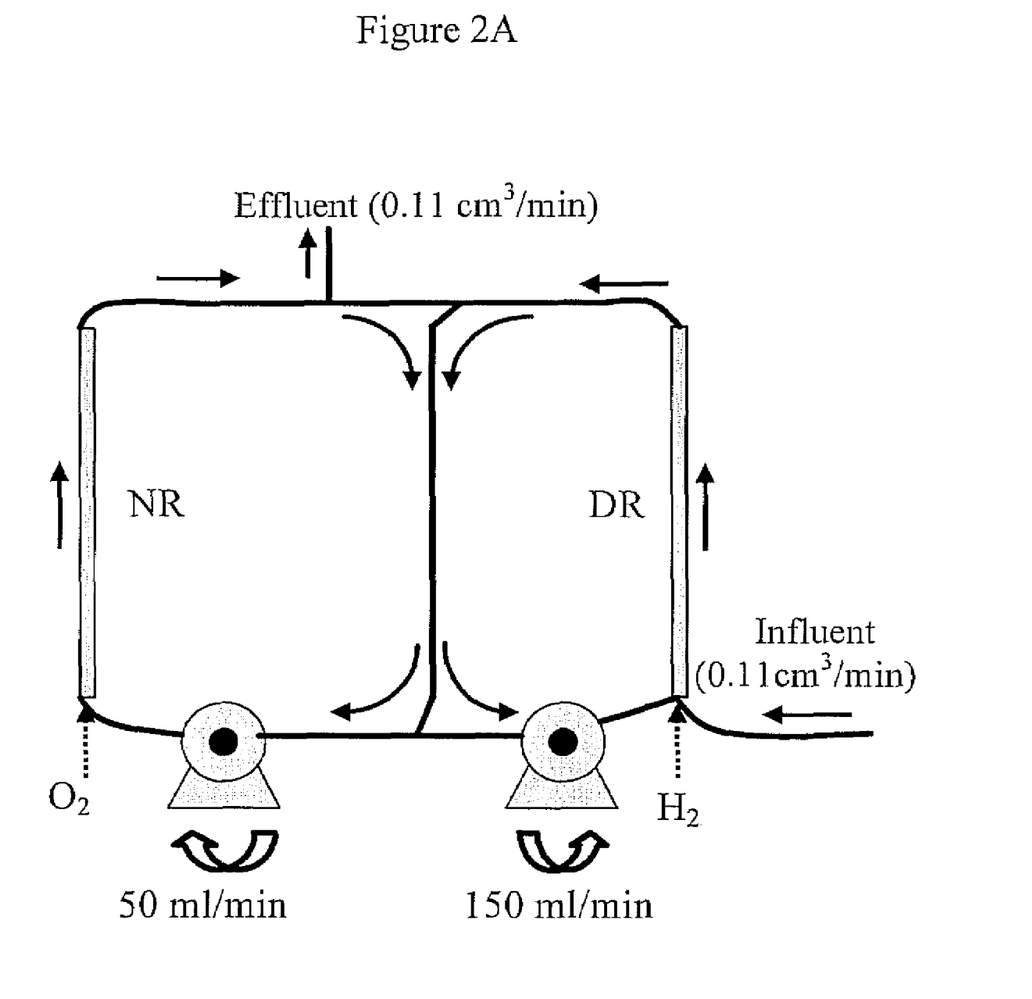
FIGS. 2A-B: Configurations of aerobic and anoxic MBfR component systems, in accordance with one or more embodiments of this invention.
Figure 2B:
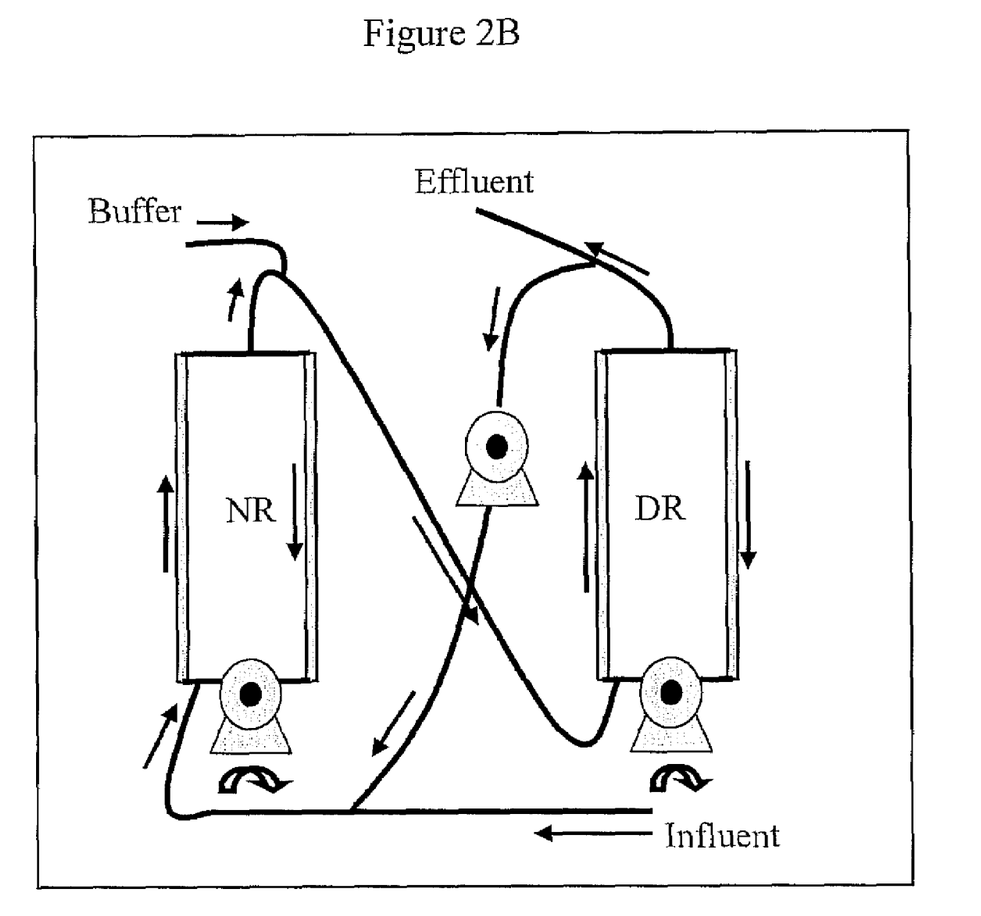

Accordingly, an aerobic and anoxic system of this invention can comprise two MBfRs for integrated operation. One MBfR component is supplied with $O_2$ gas to achieve nitrification (NR). The other MBfR component is supplied with $H_2$ gas to achieve denitrification (DR)—to approach complete N removal. One such aerobic and anoxic component configuration is shown in FIG. 2A. In certain embodiments, each column has 32 hollow fibers of length 25 cm, giving a total biofilm surface area of 70.6 $cm^2$ for each MBfR component. The volume of each MBfR is approximately 10 $cm^3$. A useful influent pumping rate is set to 0.11 $cm^3$/min, giving a detention time for the MBfR system of approximately 3 hours. The recycle flow rates shown in FIG. 2A (e.g., a pump at 50 ml/min and a pump at 150 ml/min) can be used to link the two MBfRs and to provide adequate mixing and ensure adequate oxidation/reduction. An alternate component configuration is shown in FIG. 2B and provides for optional, extraneous buffer capability. Introduction of a buffer component (i.e., for acid and/or base neutralization) may be desired for treatment of waste streams having elevated levels of nitrogenous waste. Likewise, depending on volume or contaminant levels, multiple hollow fiber membrane components can be employed with the nitrification and/or denitrification aspects of this invention.

Various other embodiments of this invention can be considered with reference to the apparatus components and materials of the systems provided in the aforementioned incorporated '262 patent and co-pending '051 application, in particular FIGS. 1-2 thereof. Alternatively, membranes useful in conjunction with this invention can comprise one or more sheets or another material arrangement known in the art. Regardless, whether fiber, sheet or another such arrangement, membrane components can be positioned randomly or in a predetermined spatial configuration, such as without limitation in a row configuration, or in a configuration of rows and columns. With respect to the latter, one or more grid support components can be used to position the fibers or sheets at points with respect to one or more oxygen or hydrogen sources. Positional configuration of such components can define intercomponent spaces for movement of water therethrough. Without limitation, such spacing allows movement of water-borne contaminants transverse to membrane components, as is especially useful in the treatment of waste water and other aqueous systems comprising solid particulate matter. Such components and related apparatus configurations are described more fully in co-pending application Ser. No. 10/876,745, in particular FIGS. 2A-C thereof, such application incorporated herein by reference in its entirety.

Examples of the Invention

The following non-limiting examples and data illustrate various aspects and features relating to the methods and/or apparatus of the present invention. In comparison with the prior art, the present methods and apparatus provide results and data that are surprising, unexpected and contrary thereto. While the utility of this invention is demonstrated through the use of several apparatus configurations and simulated nitrogenous waste streams in conjunction therewith, it will be understood by those skilled in the art that comparable results are obtainable with various other apparatus and waste stream compositions (e.g., organic amines and ammonium compounds), as are commensurate with the broad scope of the present methodology. As such, the present invention contemplates an apparatus/system with aerobic and anoxic components for sequential or simultaneous nitrification and denitrification over a range of oxygen and hydrogen gas delivery rates and pressures, to achieve effluent concentrations of less than about 1 mg/L for both reduced and oxidized nitrogen waste components, and substantially total nitrogen removal for influent waste streams containing ammonia.

A medium used in the following examples, as would be understood in the art to demonstrate the wide utility of this invention, was synthetic wastewater with the composition shown in Table 1. The ammonium concentration was 50 mg $NH_4^+$—N/l. The buffer capacity of the water was added in the form of 0.252 g/l $HCO_3^-$, 0.136 g/l $H_2PO_4^-$, and 1.134 g/l $HPO_4^{2-}$. The medium was contained in a $N_2$-gas-sparged bottle to prevent uncontrolled changes in the carbonate system.

TABLE 1

Composition of the synthetic-wastewater medium

| Media Ingredient | Quantity |
| --- | --- |
| Distilled Water | 5 L |
| $NaHCO_3$ | 1.26 g |
| $(NH_4)_2SO_4$ | 1.179 g |
| $KH_2PO_4$ | 0.681 g |
| $NaHPO_4$ | 5.678 g |
| Trace Minerals | 7.5 ml |
| Ca—Fe Solution | 7.5 ml |
| $MgSO_4$—$7H_2O$ | 7.5 ml |

The parameters measured were $NH_4^+$, $NO_3^-$, $NO_2^-$, and pH. The analytical methods are summarized in Table 2. Each method was calibrated against known standards to ensure measurement accuracy. A Spectronic Spec 20 was used to measure the absorbance of the $NH_4^+$, $NO_3^-$, and $NO_2^-$ samples.

TABLE 2

Summary of analytical methods

| Parameter | Method | Reference | Range | Std. Dev. |
| --- | --- | --- | --- | --- |
| $NO_3^-$ | Chromotropic Acid Method | Hach Method 10020 | 0-30.0 mg/l $NO_3^-$—N | +/−1% |
| $NO_2^-$ | Diazotization Chromotropic Acid Method | Hach Method 8507 | 0-0.500 mg/l $NO_2^-$—N | +/−2.3% |
| $NH_4^+$ | Salicylate Method | Hach Method 10031 | 0-50.0 mg/l $NH_3$—N | +/−2% |
| pH | Electrometric Method | Standard Methods (1998) - 4500-$H^+$ | 0-14 pH | +/−0.1 pH |

The medium was fed continuously for several weeks while biofilms accumulated on the outside of the hollow fiber membranes (see, e.g., FIG. 1B and FIG. 2A) and to establish baseline performance(s). Once a visible layer of biofilms was present and N removal was stable for the baseline conditions, experiments were run to determine the nitrogen removal under different gas pressure conditions in the MBfRs. Under constant $H_2$ pressure (2.5 psi), the removal of nitrogen was determined for the following $O_2$ pressures: 1.25 psi, 2.0 psi, and 6.0 psi. Under constant $O_2$ pressure (3.6 psi), the removal of nitrogen was determined for 1.25 psi and 5.0 psi $H_2$ pressure. The system was allowed to reach steady-state performance before changing $O_2$ or $H_2$ pressure. The $H_2$ gas pressure was originally maintained at 2.5 psi while changing the $O_2$ pressure. The $H_2$ pressure was then varied with the $O_2$ pressure maintained at 3.6 psi. At least 3 samples were taken for each gas pressure, with a minimum of 9 hours between samples. Each sample was filtered (0.45-μm membrane filter) to remove any suspended microbes detached from the biofilm.

Example 1

Baseline N Removal

Figure 3:
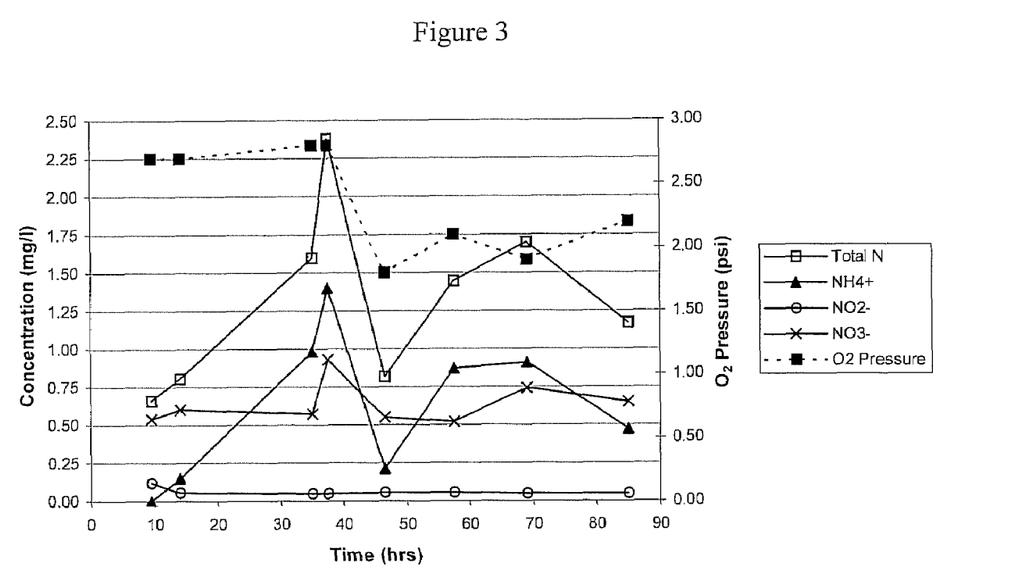
FIG. 3: Concentrations of N species during the initial 100 hours of treatment.

The first 100 hours of results in FIG. 3 show the baseline removal of N when the $H_2$ pressure was 2.5 psi and the average $O_2$ pressure was 2.5 psi. The concentrations of all N species were low: near to or less than 1 mgN/L for $NH_4^+$ and $NO_3^-$, with $NO_2^-$ nearly zero. The total N concentration (i.e., the sum of $NH_4^+ + NO_3^- + NO_2^-$ as N) always was less than 3 mgN/L and typically was less than 2 mgN/L. These results clearly demonstrate that the aerobic and anoxic MBfR system can achieve very low concentrations of all N species and total N.

Example 2

Changing $O_2$ Pressure

Figure 4:
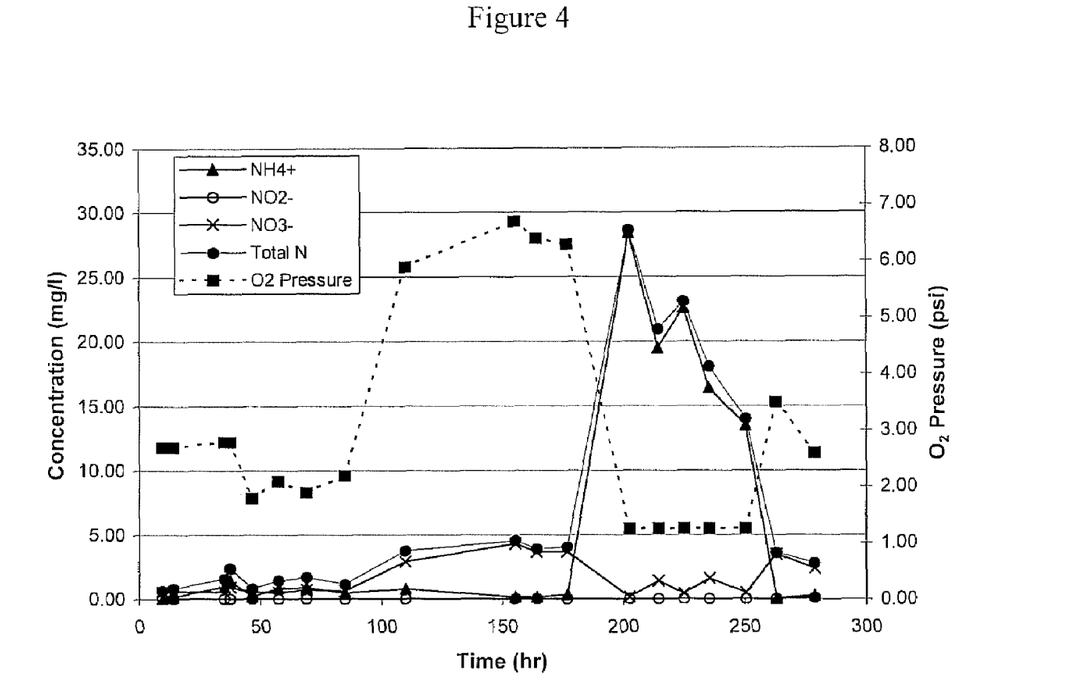
FIG. 4: $O_2$ pressure effects on N species concentrations when the $H_2$ pressure was 2.5 psi. The first 100 hours represent a baseline operation.

FIG. 4 also illustrates the general trend for nitrate and ammonium as the oxygen pressure was changed over time (at 110 to 280 hours). The ammonium concentration was greatly increased by a low oxygen pressure (1.25 psi). This was due to oxygen limitation of the nitrification reaction in the aerobic MBfR. On the other hand, the nitrate concentration was high when the oxygen pressure was increased (6 psi), presumably because dissolved oxygen carry over from the aerobic MBfR to the anoxic MBfR inhibited denitrification of $NO_3^-$ to $N_2$. The nitrite concentration was small and was largely unaffected by the gas pressures under the conditions utilized. The total nitrogen concentration mirrored the concentration of an N species that had an increased concentration due to the change in $O_2$ pressure.

The results in FIG. 4 document the anticipated trends with $O_2$ availability. Too little $O_2$ availability slowed nitrification in the aerobic MBfR, leaving $NH_4^+$ unoxidized. Too much $O_2$ availability in the aerobic MBfR led to dissolved oxygen carry over, which inhibited $NO_3^-$ reduction in the anoxic MBfR. Thus, the integrated aerobic and anoxic system behaved in a predictable manner, and showed that controlling the $O_2$ pressure to the aerobic MBfR could be used to optimize total-N removal. Proper control of the $O_2$ pressure allowed excellent removal of all N species (<1 mgN/L) and total N (<3 mgN/L), as shown by the results in the first 100 hours.

Example 3

Changing $H_2$ Pressure

Figure 5:
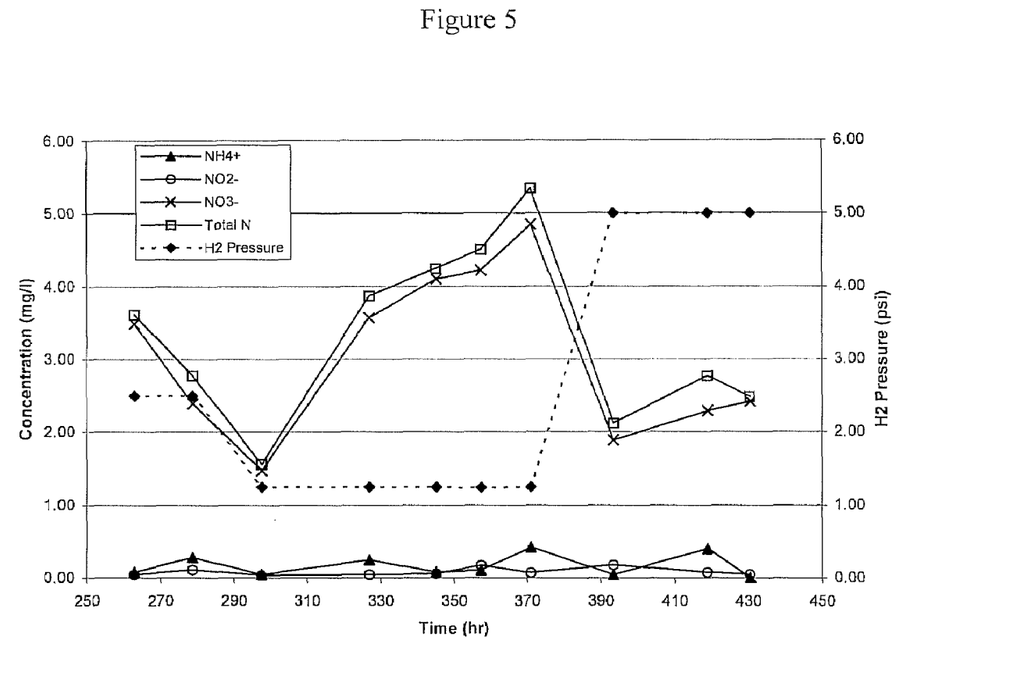
FIG. 5: $H_2$ pressure effects on N-species concentrations when the $O_2$ pressure was held constant at 3.6 psi.

FIG. 5 presents the results for variation of $H_2$ pressure while keeping the $O_2$ pressure at 3.6 psi. Varying the hydrogen pressure did not alter the concentrations as dramatically as did changing the oxygen pressure. The ammonium and nitrite concentrations were almost completely unaffected by the $H_2$ pressure changes. On the other hand, the nitrate concentrations increased substantially when the $H_2$ pressure was low (1.25 psi). The total-N concentration paralleled the $NO_3^-$ concentration.

The results in FIG. 5 document the anticipated trends with $H_2$ availability. Too little $H_2$ availability slowed denitrification in the anoxic MBfR, leaving $NO_3^-$ unreduced. However, increasing the $H_2$ availability in the anoxic MBfR appeared not to have a negative impact on nitrification in the aerobic MBfR. This good result may have occurred because $H_2$ has low water solubility, which precludes significant carry over to the aerobic MBfR. Again, the integrated aerobic and anoxic system behaved in a predictable manner, to show that controlling the $H_2$ pressure to the anoxic MBfR can be used to achieve total-N removal. Proper control of the $H_2$ pressure allows excellent removal of all N species and total N, as shown by the results in the first 100 hours (FIG. 3).

Example 4

Summary of Gas-Pressure Effects

Figure 6A:
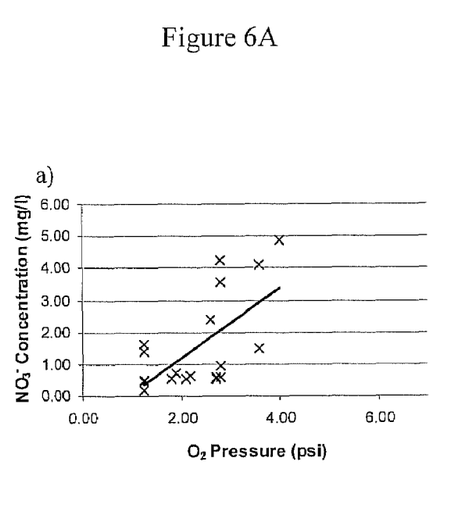
FIG. 6A: The effects of $O_2$ pressures on nitrate ($NO_3^-$) concentration.
Figure 6B:
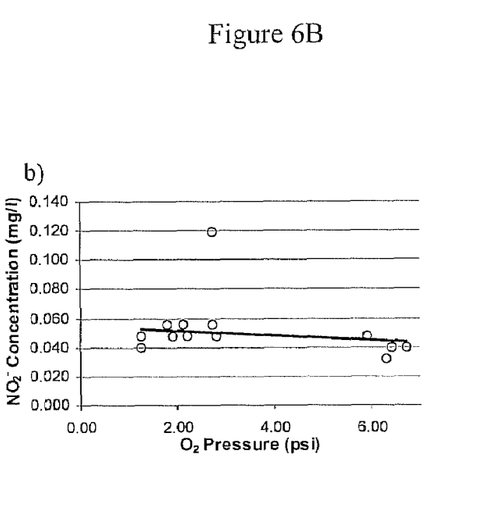
FIG. 6B: The effects of $O_2$ pressures on nitrate ($NO_2^-$) concentration.

FIGS. 6A-B summarize how the $O_2$ pressure affected the $NO_3^-$ and $NO_2^-$ concentrations for all experiments. Clearly, nitrate increased with increasing $O_2$ pressure (FIG. 6A) due to oxygen carry over from the aerobic MBfR. On the other hand, the $NO_2^-$ concentration was hardly affected by $O_2$ pressure (FIG. 6B). As shown in FIG. 5, the $H_2$ pressure strongly controlled the effluent $NO_3^-$ concentration, and pressures greater than 1.25 psi $H_2$ significantly increased nitrate removal.

Example 5

Figure 7A:
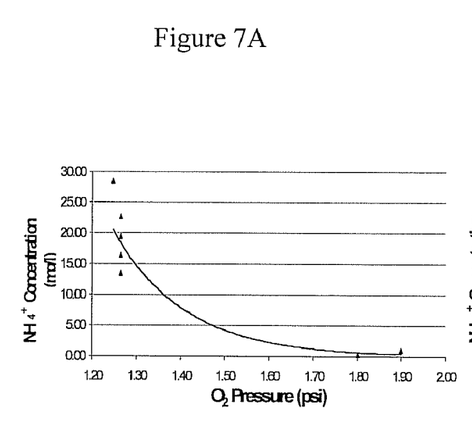
FIG. 7A: The effects of $O_2$ gas on $NH_4^+$ concentrations when $O_2$<2.0 psi. (Note: The trend line in FIG. 7A is exponential.)
Figure 7B:
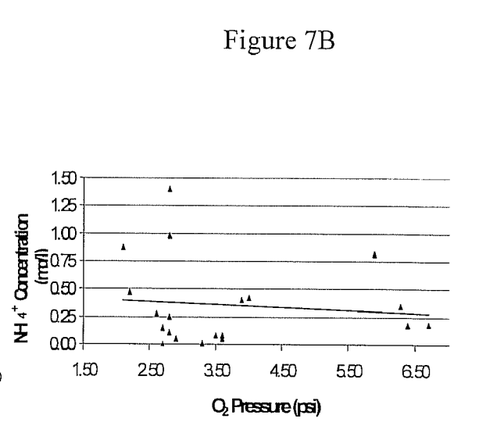
FIG. 7B: The effects of $O_2$ gas on $NH_4^+$ concentrations when $O_2$>2.0 psi. (Note: the Trend Line in FIG. 7b is Linear.)

FIGS. 7A-B shows that the ammonium concentration was drastically decreased when the $O_2$ pressure was greater than 1.25 psi. At the low $O_2$ pressures (FIG. 7A), oxygen was insufficient to allow full nitrification in the aerobic MBfR. As a result, the oxidation rates for $NH_4^+$ were low. Once the $O_2$ pressure was greater than 2.5 psi (FIG. 7B), $NH_4^+$ removal did not correlate strongly with $O_2$ pressure, although there is a slight downward sloping trend between the two variables (R=−0.23). As shown in FIG. 5, $NH_4^+$ did not correlate to $H_2$ pressure.

Example 6

Summary of Nitrogen Removal Efficiency

Figure 8:
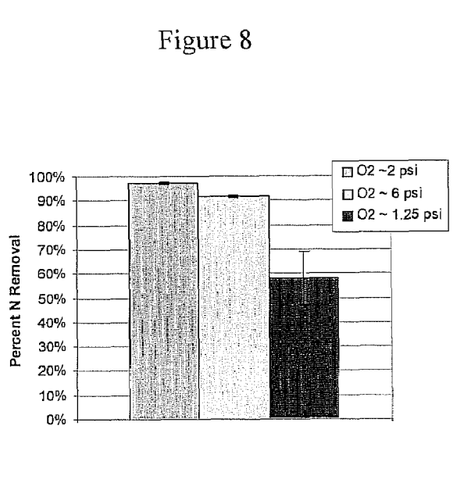
FIG. 8: Percent total-N removal for constant pressure (2.5 psi) and an influent $NH_4^+$ concentration of 50 mgN/L.
Figure 9:
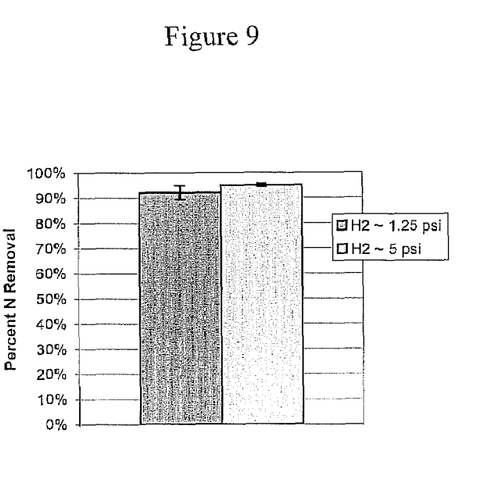
FIG. 9: Percent total-N removal at constant $O_2$ pressure (~3.6) and an influent $NH^+_4$ concentration of 50 mgN/L.

FIGS. 8 and 9 summarize the total-N removal efficiencies when the influent had a fixed N concentration of 50 mgN/L, all as $NH_4^+$. At constant $H_2$ pressure to the anoxic MBfR (2.5 psi), the total nitrogen removal (FIG. 8) was greatest for the intermediate $O_2$ pressure of 2.0 psi to the aerobic MBfR (97.1%). This corresponds to an effluent total N of only 1.5 mgN/L. At 6.0 psi, the nitrogen removal was 91.9%, and decrease was due to increased $NO_3^-$. Modest removal was achieved with at 1.25 psi, with a nitrogen removal of 58.1% and mostly $NH_4^+$ in the effluent. Again, controlling $O_2$ availability in the aerobic MBfR can be used to achieve very high total-N removal.

At constant $O_2$ pressure (~3.6 psi), under the conditions/apparatus used the total nitrogen removal was optimized at 5 psi for $H_2$ (95.1%, giving an effluent total N of 2.5 mgN/L). At 1.25 psi, the nitrogen removal was slightly less, 92.2%, due to less denitrification. Controlling $H_2$ availability in the anoxic MBfR can be effective, but maximum total-N removal appears more directly related to $O_2$ availability in the aerobic MBfR.

The preceding examples show that an aerobic and anoxic MBfR system, in accordance with this invention, can provide nearly complete removal of total N. Reduced N contaminant (s) and a concentration of ~50 mgN/L, as used herein, are conditions typical for municipal wastewater and relevant to many other wastewaters. Under aerobic conditions ($O_2$ gas) nitrifying biofilm oxidized $NH_4^+$ to $NO_3^-$ and $NO_2^-$, while under anoxic conditions ($H_2$ gas) denitrifying biofilm reduced the $NO_3^-$ and $NO_2^-$ to $N_2$ gas. Since the nitrifying and denitrifying bacteria are autotrophic, no carbonaceous energy source was required, thereby eliminating significant material costs and process hazards.

Total-N removal can be influenced by the $O_2$ pressure in that insufficient $O_2$ pressure decreased nitrification of $NH_4^+$ to $NO_3^-$ or $NO_2^-$, while high $O_2$ pressure can inhibit denitrification of $NO_3^-$ to $N_2$ gas in the anoxic component. Total nitrogen removal is less strongly influenced by $H_2$ pressure, although increasing $H_2$ pressures can provide better denitrification without affecting nitrification.

While the principles of this invention have been described in connection with specific embodiments, it should be understood clearly that these descriptions are added only by way of example and are not intended to limit, in any way, the scope of this invention. For instance, simultaneous or coordinated nitrification and denitrification are demonstrated, here, in the context of total N removal, but this invention can also be used in conjunction with various other waste streams, whenever reduced and oxidized contaminants co-exist. Reduced contaminants can further include, without limitation, all organic matter, and organic nitrogen compounds, whereas oxidized contaminants can, likewise without limitation, include perchlorate, chlorate, chlorite, chromate, selenate, selenite, bromate, sulfate, sulfite, uranium, plutonium, neptunium and chlorinated organic compounds such as but not limited to trichloroethene and trichloroethene.

We claim:

1. A method for removing a nitrogenous contaminant from water, comprising:
   providing a system having an inlet for introduction of water comprising a nitrogenous contaminant and a nitrification reactor in fluid communication with a denitrification reactor;
   introducing water via the inlet to the system, for flow through the nitrification and denitrification reactors;
   introducing oxygen gas to the nitrification reactor, to establish in the nitrification reactor a biofilm comprised of nitrifying bacteria capable of oxidizing the nitrogenous contaminant to form an oxidized contaminant;
   introducing hydrogen gas to the denitrification reactor, to establish a biofilm comprised of denitrifying bacteria capable of reducing the oxidized contaminant; and
   controlling the amount of oxygen gas introduced to the nitrification reactor to promote reduction of the oxidized contaminant in the denitrification reactor.

2. The method of claim 1, further comprising controlling the amount of hydrogen gas introduced to the denitrification reactor to promote reduction of the oxidized contaminant.

3. The method of claim 2, wherein controlling the amount of oxygen gas is achieved by adjusting a pressure of oxygen gas applied to the nitrification reactor.

4. The method of claim 3, wherein controlling the amount of hydrogen gas is achieved by adjusting a pressure of hydrogen gas applied to the denitrification reactor.

5. The method of claim 4, wherein the controlling the amount of oxygen gas and the controlling the amount of hydrogen gas achieves a ratio of pressure of oxygen gas to pressure of hydrogen gas of between about 0.5-2.9.

6. The method of claim 1, wherein said providing includes providing a nitrification reactor comprising a plurality of hollow fiber membranes, and wherein said introducing comprises introducing oxygen gas to the plurality of hollow fiber membranes.

7. The method of claim 1, wherein said providing includes providing a denitrification reactor comprising a plurality of hollow fiber membranes, and wherein said introducing comprises introducing hydrogen gas to the plurality of hollow fiber membranes.

8. A method for removing a nitrogenous contaminant in water, comprising:

introducing water containing the contaminant to a system comprised of a first component and a second component, contacting the first component with oxygen gas and the second component with hydrogen gas, to establish in said first component a biofilm comprised of nitrifying bacteria capable of oxidizing the nitrogenous contaminant to form an oxidized nitrogenous contaminant, and in said second component a biofilm comprised of denitrifying bacteria;

controlling the amount of oxygen gas in the first component to promote reduction of the oxidized nitrogenous contaminant in the second component.

9. The method of claim 8, further comprising controlling the amount of hydrogen gas in the second component to promote denitrification of the oxidized nitrogenous contaminant to nitrogen gas.

* * * * *